United States Patent
Shibuya

(10) Patent No.: US 8,983,519 B2
(45) Date of Patent: Mar. 17, 2015

(54) RADIO COMMUNICATION SYSTEM, A RADIO TERMINAL, AND A COMMUNICATION CONTROL METHOD FOR HANDLING INCONSISTENT POWER CONTROL REQUESTS

(75) Inventor: Takafumi Shibuya, Yokohama (JP)

(73) Assignee: Kyocera Corporation, Kyoto (JP)

( * ) Notice: Subject to any disclaimer, the term of this patent is extended or adjusted under 35 U.S.C. 154(b) by 843 days.

(21) Appl. No.: 13/125,870

(22) PCT Filed: Oct. 28, 2009

(86) PCT No.: PCT/JP2009/068453
§ 371 (c)(1),
(2), (4) Date: Apr. 25, 2011

(87) PCT Pub. No.: WO2010/050487
PCT Pub. Date: May 6, 2010

(65) Prior Publication Data
US 2011/0223950 A1 Sep. 15, 2011

(30) Foreign Application Priority Data
Oct. 28, 2008 (JP) .................................. 2008-276942

(51) Int. Cl.
*H04B 7/00* (2006.01)
*H04W 52/24* (2009.01)
*H04W 52/26* (2009.01)

(52) U.S. Cl.
CPC .......... *H04W 52/243* (2013.01); *H04W 52/265* (2013.01); *Y02B 60/50* (2013.01)
USPC ....................................................... 455/522

(58) Field of Classification Search
CPC ............ H04W 52/146; H04W 52/243; H04W 52/343; H04W 52/247; H04W 52/265; H04W 52/262; H04W 52/48; H04W 52/24; H04W 52/50; H04W 52/367; H04B 17/005
See application file for complete search history.

(56) References Cited

U.S. PATENT DOCUMENTS 5,265,119 A * 11/1993 Gilhousen et al. ............ 455/522
8,116,799 B2   2/2012 Cho et al.
(Continued)

FOREIGN PATENT DOCUMENTS

JP    A-2001-144680    5/2001
JP    A 2002-247626    8/2002
(Continued)

OTHER PUBLICATIONS

International Search Report issued in PCT/JP2009/068453, mailed Jan. 19, 2010. (with English-language translation).
(Continued)

*Primary Examiner* — Nay A Maung
*Assistant Examiner* — Alejandro Rivero
(74) *Attorney, Agent, or Firm* — Oliff PLC

(57) ABSTRACT

A control unit for a wireless terminal includes a power amplification request/modulation method reception unit which receives uplink communication channel power amplification requests transmitted from a wireless base station connected to the wireless terminal, a power reduction request reception unit which receives uplink communication channel power reduction requests transmitted from a wireless base station not connected to the wireless terminal, and a modulation class setting unit which, when a power amplification request is received by the power amplification request/modulation method request reception unit and a power reduction request is received by the power reduction request reception unit, sets the modulation class to a modulation class which has less transmission power than prior to the setting and that has a modulation method for which the communication quality of the aforementioned uplink communication channel is at or above a required level.

17 Claims, 8 Drawing Sheets

(56) References Cited

U.S. PATENT DOCUMENTS

| | | | |
|---|---|---|---|
| 2008/0151832 A1* | 6/2008 | Iwasaki | 370/330 |
| 2008/0214121 A1* | 9/2008 | Sutivong et al. | 455/67.13 |
| 2009/0086696 A1* | 4/2009 | Naito et al. | 370/338 |
| 2009/0190561 A1 | 7/2009 | Yokoyama | |
| 2010/0120464 A1* | 5/2010 | Bjorken et al. | 455/522 |

FOREIGN PATENT DOCUMENTS

| | | |
|---|---|---|
| JP | A 2003-289280 | 10/2003 |
| JP | A-2004-507927 | 3/2004 |
| JP | A-2007-505565 | 3/2007 |
| JP | A-2008-061250 | 3/2008 |
| KR | 10-2007-0115416 | 12/2007 |
| WO | WO 02/17511 A2 | 2/2002 |
| WO | WO 2005/027262 A2 | 3/2005 |
| WO | WO 2008/068803 A1 | 6/2008 |

OTHER PUBLICATIONS

Apr. 10, 2012 Japanese Office Action issued in Japanese Patent Application No. 2008-276942 (with translation).

Jul. 10, 2012 Office Action issued in Japanese Application No. 2008-276942 (with translation).

Jul. 20, 2012 Office Action issued in Korean Patent Application No. 10-2011-7011935 (with translation).

* cited by examiner

FIG. 11

| MODULATION CLASS | MODULATION METHOD | TERMINAL TRANSMISSION POWER |
|---|---|---|
| 1 | QPSK | A(1) |
| 2 | QPSK | A(2) |
| 3 | QPSK | A(3) |
| ⋮ | ⋮ | ⋮ |
| N | 16QAM | A(N) |
| N+1 | 16QAM | A(N+1) |
| N+2 | 16QAM | A(N+2) |
| N+3 | 16QAM | A(N+3) |
| ⋮ | ⋮ | ⋮ |
| N+M | 16QAM | A(N+M) |
| N+M+1 | 64QAM | A(N+M+1) |
| N+M+2 | 64QAM | A(N+M+2) |
| N+M+3 | 64QAM | A(N+M+3) |
| ⋮ | ⋮ | ⋮ |
| N+M+L | 64QAM | A(N+M+L) |

RADIO COMMUNICATION SYSTEM, A RADIO TERMINAL, AND A COMMUNICATION CONTROL METHOD FOR HANDLING INCONSISTENT POWER CONTROL REQUESTS

TECHNICAL FIELD

The present invention relates to a radio communication system in which a radio terminal sets transmission power and a modulation method according to a request from a radio base station, a radio terminal in the radio communication system, and a communication control method used in the radio terminal.

BACKGROUND ART

In a radio communication system, each of radio base stations allocates communication channels to a radio terminal visiting a cell provided by the radio base station. By using the allocated communication channels, the radio terminal connects with the radio base station which provides the visited cell, and communicates with the radio base station.

In the aforementioned communication, in a case where transmission power set for an uplink communication channel by the mobile terminal is fixed, an increase in distance between the radio terminal and the radio base station due to the moving of the radio terminal might deteriorate a communication quality.

In order to restrain such deterioration of the communication quality, a remedy as to be described below is taken in some cases. For example, in a radio communication system employing LTE (Long Term Evolution) which is a standard worked out by the 3GPP (Third Generation Partnership Project), a radio base station measures the communication quality of an uplink communication channel allocated to a radio terminal. If the communication quality falls below a predetermined level, the radio base station requests the radio terminal to increase transmission power.

In addition, when the same frequency band is used in the aforementioned communication for a communication channel between the radio base station and the radio terminal and a communication channel between another radio base station and another radio terminal, one communication channel might interfere with the other communication channel.

In order to restrain such interference, the radio base station requests the other radio terminal allocated the communication channel causing the interference to reduce transmission power (for example, see Patent Literature 1).

Patent Literature 1: Japanese Patent Application Publication 2002-247626

SUMMARY OF INVENTION

Meanwhile, when the restraint of the deterioration of the Communication quality and the remedy for restraining interference as described above are performed simultaneously, the radio terminal might receive a request for increase of the transmission power from the radio base station which is a connection destination of the radio terminal (hereinafter, referred to as a connection-destination radio base station), while receiving a request for reduction of the transmission power from a radio base station which is not the connection, destination of the radio terminal (hereinafter, referred to as a non connection-destination radio base station).

There has conventionally been a problem that, upon receipt of such inconsistent requests for increase and reduction, the radio terminal cannot achieve both the restraint of the deterioration of the communication quality and the restraint of the interference.

In view of the above problem, an objective of the present invention is to provide a radio communication system, a radio terminal, and a communication control method which are capable of appropriately performing both restraint of deterioration of a communication quality and restraint of interference.

To solve the problem described above, the present invention has the following aspects. Firstly, a first aspect of the present invention is summarized as follows. A radio communication system (a radio communication system 10) includes a radio terminal (a radio terminal 1A, a radio terminal 1B, a radio terminal 1C), a connection-destination radio base station which is a radio base station as a connection destination for the radio terminal (a radio base station 2A for the radio terminal 1A, a radio base station 2B for the radio terminal 1B, a radio base station 2C for the radio terminal 1C), and a non connection-destination radio base station which is a radio base station other than the connection destination for the radio terminal (the radio base station 2B and the radio base station 2C for the radio terminal 1A, the radio base station 2A and the radio base station 2C for the radio terminal 1B, the radio base station 2A and the radio base station 2B for the radio terminal 1C). The connection-destination radio base station includes a communication-quality measurement unit (a CQI measurement unit 252 and a CRC check unit 258) configured to measure a communication quality of an uplink communication channel of the connection-destination radio base station, and a power-increase-request transmitter (a transmission-power/modulation-method setting unit 260 and a message transmitter 262) configured to transmit a power-increase request to the radio terminal when the communication quality measured by the communication-quality measurement unit is lower than a first level, the power-increase request being for requesting increase of transmission power of the uplink communication channel. The non connection-destination radio base station includes an interference-power measurement unit (an interference-power measurement unit 272) configured to measure interference power generated in a communication channel of the non connection-destination radio base station due to communication through the uplink communication channel, and a power-reduction-request transmitter (a transmission-power setting unit 274 and a message transmitter 276) configured to transmit a power-reduction request to the radio terminal when the interference power measured by the interference-power measurement unit is not lower than a second level, the power-reduction request being for requesting reduction of transmission power of the uplink communication channel. The radio terminal includes a power-increase-request receiver (a power-reduction-request receiver 202) configured to receive the power-increase request from the connection-destination radio base station, a power-reduction-request receiver configured to receive the power-reduction request from the non connection-destination radio base station, and a modulation-class setting unit (a modulation-class setting unit 208) configured such that, when the power-increase-request receiver receives the power-increase request and the power-reduction-request receiver receives the power-reduction request, the modulation-class setting unit sets transmission power lower than most recent transmission power and a modulation method in which the communication quality of the uplink communication channel is not lower than a required level, for a modulation class in which transmission power for the uplink communication channel and a modulation method are combined.

According to the radio communication system as described above, the radio terminal reduces the transmission power of the uplink communication channel according to a request for reducing the transmission power by the non connection-destination radio base station. Accordingly, the interference power generated in the communication channel in the non connection-destination radio base station is restrained.

However, when the transmission power of the uplink communication channel is reduced, the reduction goes against the request for increasing the transmission power by the connection-destination radio base station, and thus the communication quality of the uplink communication channel is deteriorated. For this reason, the radio terminal sets the modulation method for the uplink communication channel to a modulation method in which the communication quality of the uplink communication channel becomes equal to or higher than a required level. Thus, the interference power generated in the communication channel in the non connection-destination radio base station is restrained, while the deterioration of the communication quality in the connection-destination radio base station is restrained.

A second aspect of the present invention is summarized as follows. A radio terminal which communicates with radio base stations, the radio terminal includes: power-increase-request receiver configured to receive a power-increase request transmitted from a connection-destination radio base station which is a radio base station as a connection destination, the power-increase request being for requesting increase of transmission power of an uplink communication channel; a power-reduction-request receiver configured to receive a power-reduction request transmitted from a non connection-destination radio base station which is a base station other than the connection destination, the power-reduction request being for requesting reduction of the transmission power of the uplink communication channel; and a modulation-class setting unit configured such that, when the power-increase-request receiver receives the power-increase request and the power-reduction-request receiver receives the power-reduction request, the modulation-class setting unit sets transmission power lower than most recent transmission power and a modulation method in which the communication quality of the uplink communication channel is not lower than a required level, for a modulation class in which transmission power for the uplink communication channel and a modulation method are combined.

According to the radio terminal as described above, the radio terminal reduces the transmission power of the uplink communication channel according to the request for reducing the transmission power by the non connection-destination radio base station as in described above, while the radio terminal sets the modulation method for the uplink communication channel to a method in which the communication quality of the uplink communication channel becomes equal to or higher than the required level. Thus, the interference power generated in the communication channel in the non connection-destination radio base station is restrained, while the deterioration of the communication quality in the connection-destination radio base station is restrained.

A third aspect of the present invention is summarized as follows. The power-reduction request includes a transmission power value, and the modulation-class setting unit sets transmission power corresponding to the transmission power value included in the power-reduction request.

A fourth aspect of the present invention is summarized as follows. The power-reduction-request receiver receives a plurality of the power-reduction requests transmitted from a plurality of the non connection-destination radio base stations, respectively, the modulation-class setting unit sets transmission power corresponding to any one of a lowest value in the transmission power values and an average value thereof, the transmission power values being included in the plurality of the power-reduction requests.

A fifth aspect of the present invention is summarized as follows. The radio terminal further comprising a modulation-method-request receiver (a power-increase-request/modulation-method-request receiver 204) configured to receive a modulation-method request transmitted from the connection-destination radio base station, the modulation-method request being for requesting setting of a modulation method of the uplink communication channel, wherein the modulation-class setting unit sets a modulation method corresponding to the modulation-method request received by the power-increase-request receiver.

A sixth aspect of the present invention is summarized as follows. The radio terminal, wherein when the communication quality of the uplink communication channel is lower than the required level, the modulation-class setting unit stops setting the modulation method corresponding to the modulation-method request in the modulation class having the modulation method corresponding to the modulation-method request.

According to the radio terminal as described above, when the communication quality of the uplink communication channel is lower than the required level, the deterioration of the communication quality of the uplink communication channel cannot be restrained by using the modulation method requested by the connection-destination radio base station. Thus, the radio terminal stops setting the modulation method requested by the connection-destination radio base station, and thereby can appropriately restrain the deterioration of the communication quality of the uplink communication channel.

A seventh aspect of the present invention is summarized as follows. The radio terminal, comprising a retransmission-request receiver configured to receive a retransmission request transmitted by the connection-destination radio base station, wherein when the retransmission-request receiver receives the retransmission request, the modulation-class setting unit sets transmission power higher than most recent transmission power only at the time of transmitting a radio signal targeted by the retransmission request.

A eighth aspect of the present invention is summarized as follows. A communication control method used in a radio terminal which communicates with radio base stations, the communication control method comprising the steps of: receiving, by the radio terminal, a power-increase request transmitted from a connection-destination radio base station which is a radio base station as a connection destination, the power-increase request being for requesting increase of transmission power of an uplink communication channel; receiving, by the radio terminal, a power-reduction request transmitted from a non connection-destination radio base station which is a base station other than the connection destination, the power-reduction request being for requesting reduction of the transmission power of the uplink communication channel; and upon receipt of the power-increase request and the power-reduction request, setting, by the radio terminal, transmission power lower than most recent transmission power and a modulation method in which the communication quality of the uplink communication channel is not lower than a required level, for a modulation class in which transmission power for the uplink communication channel and a modulation method are combined.

According to the present invention, the radio terminal reduces the transmission power of the uplink communication channel according to the request for restraining the transmission power by the non connection-destination radio base station, and sets the modulation method of the uplink communication channel to a modulation method in which the communication quality of the uplink communication channel is equal to or higher than the required level. Thereby, the interference power generated in the communication channel in the non connection-destination radio base station is restrained, while the deterioration of the communication quality of the uplink communication channel in the connection-destination radio base station is restrained.

BRIEF DESCRIPTION OF DRAWINGS

FIG. 11 is a chart showing an example of a modulation class table.

BEST MODE FOR CARRYING OUT THE INVENTION

Figure 1:
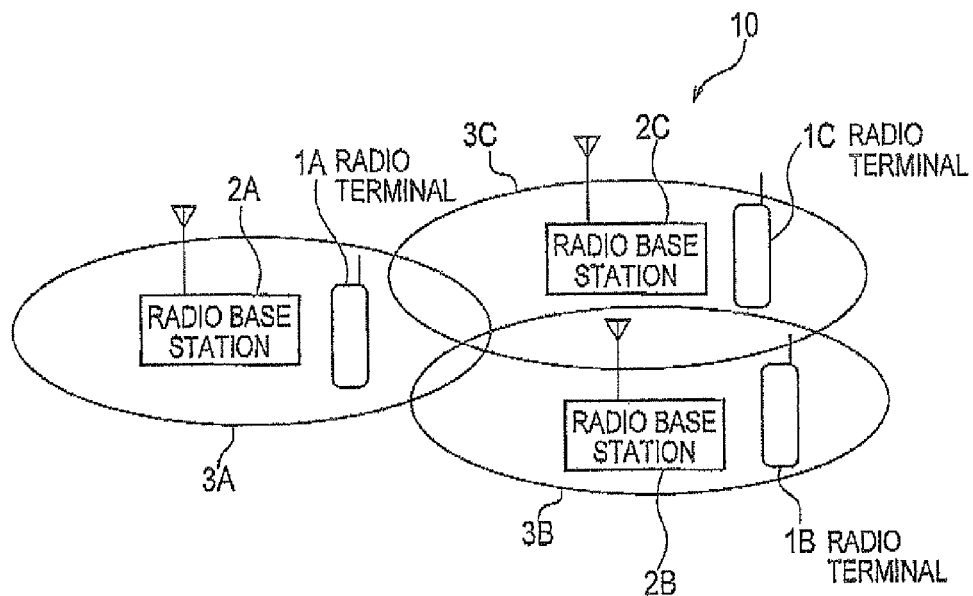
FIG. 1 is an overall schematic configuration diagram of a radio communication system according to an embodiment of the present invention.

Next, a description is given of an embodiment of the present invention by referring to the drawings. Specifically, the description is given of (1) Configuration of Radio Communication System, (2) Operation of Radio Communication System, (3) Advantageous Effects, and (4) Other Embodiment. In the following description of the drawings in the embodiment, same or similar reference signs denote same or similar elements and portions.

(1) Configuration of Radio Communication System

First, a description is given of a configuration of a radio communication system according to the embodiment of the present invention, in the order of (1.1) Overall Schematic Configuration of Radio Communication System, (1.2) Configuration of Radio Terminal, and (1.3) Configuration of Radio Base Station.

(1.1) Overall Schematic Configuration of Radio Communication System

FIG. 1 is an overall schematic configuration diagram of a radio communication system 10 according to the embodiment of the present invention.

As shown in FIG. 1, the radio communication system 10 includes a radio terminal 1A, a radio terminal 1B, a radio terminal 1C, a radio base station 2A, a radio base station 2B, and a radio base station 2C. The radio communication system 10 has a configuration based on LTE which is a standard worked out by the 3GPP. In FIG. 1, the radio terminal 1A visits a cell 3A provided by the radio base station 2A, the radio terminal 1B visits a cell 3B provided by the radio base station 2B, and the radio terminal 1C visits a cell 3C provided by the radio base station 2C.

Each of the radio terminal 1A, the radio terminal 1B, and the radio terminal 1C compares communication qualities (reception SNR, reception RSSI, reception FER, and the like) of reference signals and pilot signals which are transmitted by the radio base stations 2A to 2C, at the time of powering on and handover, and transmits a location registration request to a radio base station which has transmitted a reference signal or the like having the highest quality. Upon receipt of the location registration request from the radio terminal, the radio base station performs the location registration for the radio terminal and allocates communication channels to the radio terminal. This enables communication between the radio terminal and the radio base station.

In the example in FIG. 1, the radio terminal 1A visits the cell 3A. Thus, a reference signal or the like from the radio base station 2A generally has the highest communication quality in the radio terminal 1A. In this case, the radio terminal 1A transmits a location registration request to the radio base station 2A. Upon receipt of the location registration request from the radio terminal 1A, the radio base station 2A performs location registration for the radio terminal 1A and allocates communication channels to the radio terminal 1A.

The radio terminal 1A connects with the radio base station 2A in such processing. This means that the radio base station 2A is a connection-destination radio base station of the radio terminal 1A, and the radio base station 2B and the radio base station 2C are non connection-destination radio base stations of the radio terminal 1A.

Meanwhile, the radio terminal 1B visits the cell 3B. Thus, a reference signal or the like from the radio base station 2B generally has the highest communication quality in the radio terminal 1B. In this case, the radio terminal 1B transmits a location registration request to the radio base station 2B. Upon receipt of the location registration request from the radio terminal 1B, the radio base station 2B performs location registration for the radio terminal 1B and allocates communication channels to the radio terminal 1B.

The radio terminal 1B connects with the radio base station 2B in such processing. This means that the radio base station 2B is a connection-destination radio base station of the radio terminal 1B, and the radio base station 2A and the radio base station 2C are non connection-destination radio base stations of the radio terminal 1B.

In addition, the radio terminal 1C visits the cell 3C. In this case, a reference signal or the like from the radio base station 2C generally has the highest communication quality in the radio terminal 1C. Thus, the radio terminal 1C transmits a location registration request to the radio base station 2C. Upon receipt of the location registration request from the radio terminal 1C, the radio base station 2C performs location registration for the radio terminal 1C and allocates communication channels to the radio terminal 1C.

The radio terminal 1C connects with the radio base station 2C in such processing.

This means that the radio base station 2C is a connection-destination radio base station of the radio terminal 1C, and the radio base station 2A and the radio base station 2B are non connection-destination radio base stations of the radio terminal 1C.

Thereafter, communications are performed between the radio terminal 1A and the radio base station 2A, between the radio terminal 1B and the radio base station 2B, and between the radio terminal 1C and the radio base station 2C. In the example in FIG. 1, the radio terminal 1A transmits data to the radio base station 2A by using an uplink communication channel. In contrast, the radio base station 2A transmits data to the radio terminal 1A by using a downlink communication channel. Likewise, communications between the radio terminal 1B and the radio base station 2B and communications between the radio terminal 1C and the radio base station 2C are performed.

(1.2) Configuration of Radio Terminal

Next, a description is given of a configuration of each of the radio terminals 1A to 1C in the order of (1.2.1) Schematic Configuration of Radio Terminal and (1.2.2) Detailed Configuration of Radio Terminal.

However, since schematic configurations of the radio terminal 1B and the radio terminal 1C are the same as the schematic configuration of the radio terminal 1A, descriptions of schematic configurations and detailed configurations of the radio terminal 1B and the radio terminal 1C are omitted.

(1.2.1) Schematic Configuration of Radio Terminal

Figure 2:
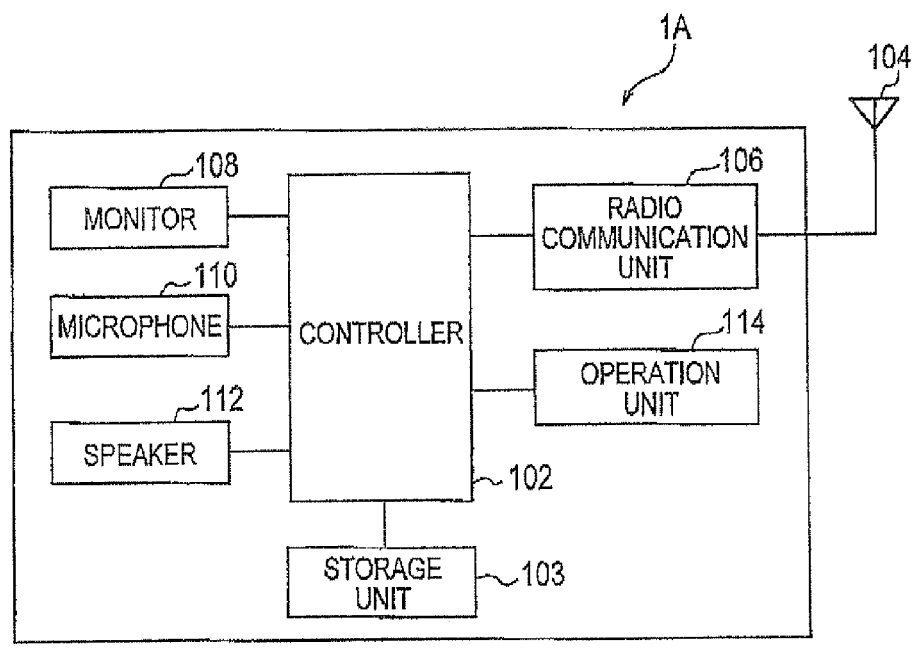
FIG. 2 is a schematic configuration diagram of a radio terminal according to the embodiment of the present invention.

FIG. 2 is a schematic configuration diagram of the radio terminal 1A. As shown in FIG. 2, the radio terminal 1A includes a controller 102, a storage unit 103, an antenna 104, a radio communication unit 106, a monitor 108, a microphone 110, a speaker 112, and an operation unit 114.

The controller 102 is formed, for example, by a CPU and controls various functions provided to the radio terminal 1A. The storage unit 103 is formed, for example, by a memory and stores various information used for control and the like performed in the radio terminal 1A.

The radio communication unit 106 includes an RF circuit, a baseband circuit, and the like, performs modulation and demodulation, and encoding and decoding, and the like, and transmits and receives radio signals through the antenna 104. In addition, the radio communication unit 106 periodically receives reference signals and the like transmitted by the radio base stations 2A to 2C, through the antenna 104.

The monitor 108 displays an image received through the controller 102 and displays the detail of operations (such as a telephone number and an address which are inputted). The microphone 110 collects voice and outputs voice data based on the collected voice to the controller 102. The speaker 112 outputs the voice based on the voice data acquired from the controller 102.

The operation unit 114 is formed by ten keys, function keys, and the like and is an interface used for inputting the detail of user operations.

(1.2.2) Detailed Configuration of Radio Terminal

Figure 3:
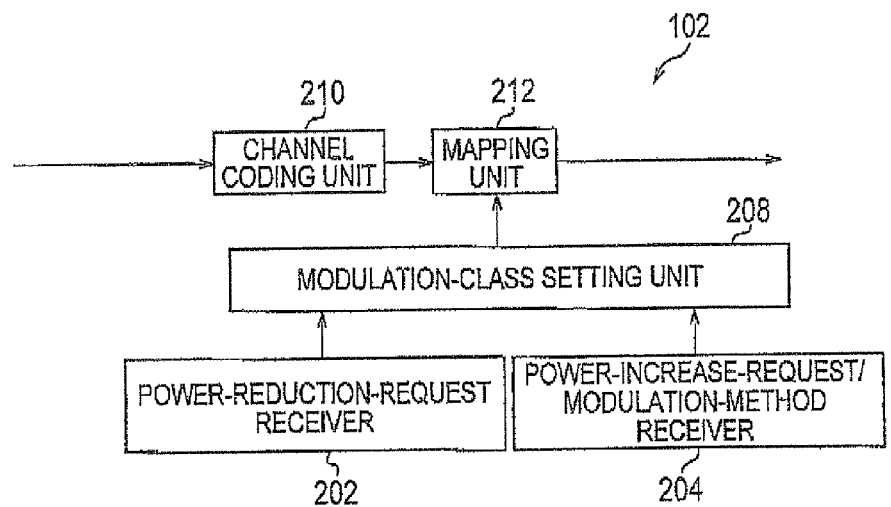
FIG. 3 is a functional block configuration diagram of a controller in the radio terminal according to the embodiment of the present invention.

Next, a description is given of the detailed configuration of the radio terminal 1A, specifically, a functional block configuration of the controller 102. FIG. 3 is a functional block configuration diagram of the controller 102. As shown in FIG. 3, the controller 102 includes a power-reduction-request receiver 202, a power-increase-request/modulation-method-request receiver 204, a modulation-class setting unit 208, a channel coding unit 210, and a mapping unit 212.

The power-reduction-request receiver 202 receives a transmission-power-reduction request from the radio base station 2B or the radio base station 2C which is the non connection-destination radio base station of the radio terminal 1A.

The transmission-power-reduction request is transmitted to the radio terminal 1A by the radio base station 2B or the radio base station 2C so as to reduce transmission power of the uplink communication channel of the radio base station 2A and thereby to further reduce interference power, when interference power of a predetermined value or higher is generated in the communication channel of the radio base station 2B (the communication channel between the radio base station 2B and the radio terminal 1B) or in the communication channel of the radio base station 2C (the communication channel between the radio base station 2C and the radio terminal 1C) due to communication between the radio terminal 1A and the radio base station 2A through the uplink communication channel (the communication channel from the radio terminal 1A to the radio base station 2A).

Further, the power-reduction-request receiver 202 outputs the received transmission-power-reduction request to the modulation-class setting unit 208.

The power-increase-request/modulation-method-request receiver 204 receives a transmission-power-increase request or a modulation-method request from the radio base station 2A which is the connection-destination radio base station.

The transmission-power-increase request is transmitted to the radio terminal 1A by the radio base station 2A so as to increase the transmission power of the uplink communication channel of the radio base station 2A and thereby to enhance the communication quality, when a communication quality of the uplink communication channel of the radio base station 2A is lower than a predetermined level.

The modulation-method request is transmitted to the radio terminal 1A by the radio base station 2A so that a predetermined modulation method can be used in the communication in the radio base station 2A through the uplink communication channel.

Furthermore, the power-increase-request/modulation-method-request receiver 204 outputs the transmission-power-increase request and the modulation-method request which are received, to the modulation-class setting unit 208.

Based on the transmission-power-reduction request, the transmission-power-increase request, and the modulation-method request which are received, the modulation-class setting unit 208 sets a modulation class in which transmission power and a modulation method for the uplink communication channel is combined (to be described later with FIG. 11) Further, the modulation-class setting unit 208 outputs the set modulation class of the uplink communication channel, to the mapping unit 212.

Upon receipt of data to be transmitted through the uplink communication channel, the channel coding unit 210 performs channel coding processing such as adding CRC (Cyclic Redundancy Check) data to the data and encoding the data. Furthermore, the channel coding unit 210 outputs the data subjected to the channel coding processing, to the mapping unit 212.

The mapping unit 212 modulates the data from the channel coding unit 210 according to the modulation method indicated by the modulation class of the uplink communication channel outputted from the modulation-class setting unit 208. Further, the mapping unit 212 transmits a radio signal which is a signal after the modulation, to the radio base station 2A through the uplink communication channel in transmission power indicated by the modulation class of the uplink communication channel.

(1.3) Configuration of Radio Base Station

Next, a description is given of the configuration of each of the radio base stations 2A to 2C in the order of (1.3.1) Schematic Configuration of Radio Base Station and (1.3.2) Detailed Configuration of Radio Base Station. However, since the schematic configurations of the radio base station 2B and the radio base station 2C are the same as the schematic configuration of the radio base station 2A, descriptions of the schematic configurations of the radio base station 2B and the radio base station 2C are omitted.

(1.3.1) Schematic Configuration of Radio Base Station

Figure 4:
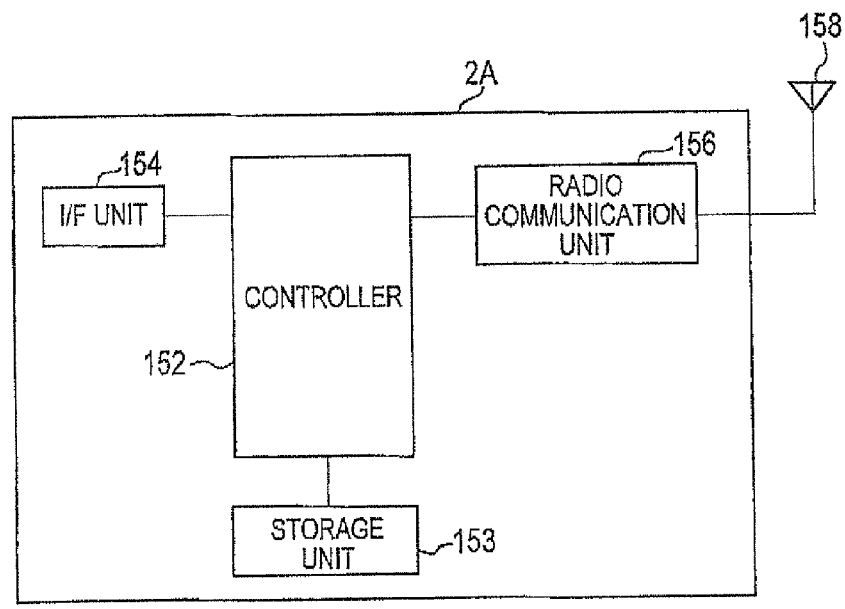
FIG. 4 is a schematic configuration diagram of a radio base station according to the embodiment of the present invention.

FIG. 4 is a schematic configuration diagram of the radio base station 2A. As shown in FIG. 4, the radio base station 2A includes a controller 152, a storage unit 153, an I/F unit 154, a radio communication unit 156, and an antenna 158.

The controller 152 is formed, for example, by a CPU and controls various functions provided to the radio base station 2A. The storage unit 153 is formed, for example, by a memory and stores various information used for control and the like performed in the radio base station 2A.

The I/F unit 154 is connected to an access gateway or the like existing in a network, through a router or the like.

The radio communication unit 156 includes an RF circuit, a baseband circuit, and the like, performs modulation and demodulation, and encoding and decoding, and the like, and transmits and receives radio signals through the antenna 158. In addition, the radio communication unit 156 transmits reference signals and the like through the antenna 158.

(1.3.2) Detailed Configuration of Radio Base Station

Figure 5:
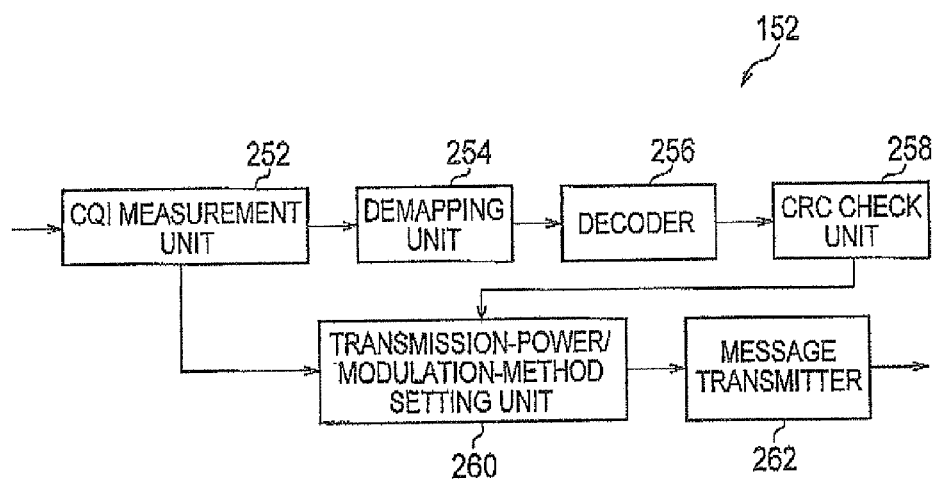
FIG. 5 is a first functional block configuration diagram of a controller in the radio base station according to the embodiment of the present invention.

Next, a description is given of the detailed configuration of each of the radio base stations 2A to 2C, specifically, a functional block configuration of the controller 152. FIG. 5 is a functional block configuration diagram of the controller 152 of the radio base station 2A in the case where the radio base station 2A is the connection-destination radio base station of the radio terminal 1A. Note that the controller 152 of the radio base station 2B in the case where the radio base station 2B is the connection-destination radio base station of the radio terminal 1B and the controller 152 of the radio base station 2B in the case where the radio base station 2C is the connection-destination radio base station of the radio terminal 1C are the same as the controller 152 of the radio base station 2A, and thus descriptions thereof are omitted.

As shown in FIG. 5, the controller 152 includes a CQI measurement unit 252, a demapping unit 254, a decoder 256, a CRC check unit 258, a transmission-power/modulation-method setting unit 260, and a message transmitter 262.

Upon receipt of a radio signal transmitted from the radio terminal 1A through the uplink communication channel, the CQI measurement unit 252 measures a CQI of the uplink communication channel. Further, the CQI measurement unit 252 outputs the received radio signal to the demapping unit 254 and outputs the measured CQI to the transmission-power/modulation-method setting unit 260.

Upon receipt of the radio signal from the CQI measurement unit 252, the demapping unit 254 demodulates the radio signal. Further, the demapping unit 254 outputs the data acquired by the demodulation to the decoder 256.

The decoder 256 decodes the data from the demapping unit 254 and outputs the data after the decoding to the CRC check unit 258.

The CRC check unit 258 receives the data from the demapping unit 254 and performs error detection based on the CRC data included in the data. Further, the CRC check unit 256 outputs a result of the error detection to the transmission-power/modulation-method setting unit 260.

The transmission-power/modulation-method setting unit 260 receives the CQI from the CQI measurement unit 252 and receives the error detection result from the CRC check unit 258. Next, if the error detection indicates that the radio signal is not correctly received, the transmission-power/modulation-method setting unit 260 sets transmission power and a modulation method which are to be used for the communication through the uplink communication channel, based on the CQI. Note that the transmission power to be set has a higher value than the transmission power used just before in the communication through the uplink communication channel. Further, the transmission-power/modulation-method setting unit 260 outputs the transmission power value and information of the modulation method which are set, to the message transmitter 262.

The message transmitter 262 transmits a transmission-power-increase request including the transmission power value outputted from the transmission-power/modulation-method setting unit 260 and a modulation-method request including the modulation method information outputted from the transmission-power/modulation-method setting unit 260, to the radio terminal 1A through the downlink communication channel.

Figure 6:
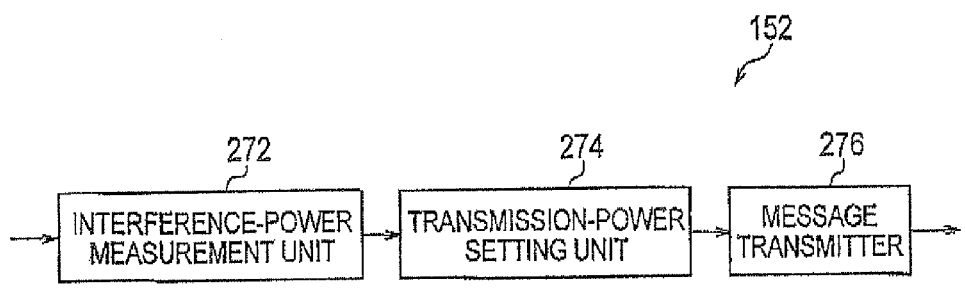
FIG. 6 is a second functional block configuration diagram of the controller in the radio base station according to the embodiment of the present invention.

FIG. 6 is a functional block configuration diagram of the controller 152 of the radio base station 2A in a case where the radio base station 2A is the non connection-destination radio base station of the radio terminal 1B or the radio terminal 1C. Note that the controller 152 of the radio base station 2B in the case where the radio base station 2B is the non connection-destination radio base station of the radio terminal 1A or the radio terminal 1C and the controller 152 of the radio base station 2C in the case where the radio base station 2C is the non connection-destination radio base station of the radio terminal 1A or the radio terminal 1B are the same as the controller 152 of the radio base station 2A, and thus descriptions thereof are omitted.

As shown in FIG. 6, the controller 152 includes an interference-power measurement unit 272, a transmission-power setting unit 274, and a message transmitter 276.

The interference-power measurement unit 272 measures interference power generated in the communication channel between the radio terminal 1A and the radio base station 2A due to the communication between the radio terminal 1B and the radio base station 2B through the uplink communication channel. Further, the interference-power measurement unit 272 outputs a value of the interference power to the transmission-power setting unit 274.

When the interference power value outputted from the interference-power measurement unit 272 is equal to or higher than a predetermined value, the transmission-power setting unit 274 sets transmission, power to be used for communication through the uplink communication channel between the radio terminal 1B and the radio base station 2B, based on the interference power value. Note that the set transmission power has a lower value than the transmission power used just before in the communication through the uplink communication channel between the radio terminal 1B and the radio base station 2B. Further, the transmission-power setting unit 274 outputs a value of the set transmission power to the message transmitter 276.

The message transmitter 276 transmits a transmission-power-reduction request including the transmission power value outputted from the transmission-power setting unit 274, to the radio terminal 1B and the radio terminal 1C.

Note that, also when interference power is generated in the communication channel between the radio terminal 1A (the radio terminal 1B) and the radio base station 2A (the radio base station 2B) due to the communication through the uplink communication channel between the radio terminal 1C and the radio base station 2C, the interference-power measurement unit 272, the transmission-power setting unit 274, and the message transmitter 276 perform the same processing as described above.

(Operation of Radio Communication System)

Firstly, a description is given of an operation at the time when a radio terminal connects with a radio base station. The description is given below by taking as an example a case where the radio base station 2A is the connection-destination radio base station of the radio terminal 1A, and the radio base station 2B and the radio base station 2C are the non connection-destination radio base stations.

Figure 7:
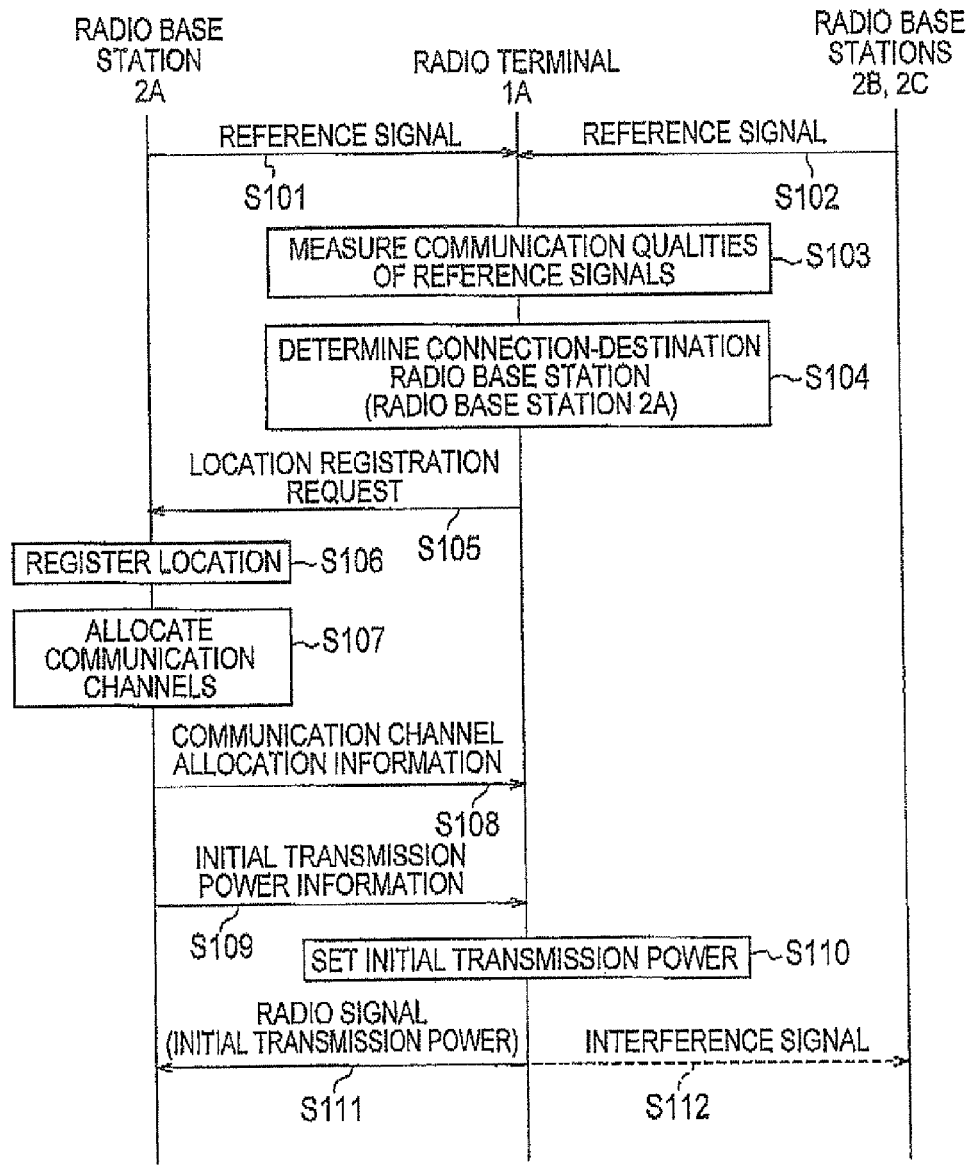
FIG. 7 is a sequence diagram showing an operation of the radio communication system according to the embodiment of the present invention.

FIG. 7 is a sequence diagram showing an operation at the time when the radio terminal 1A connects with the radio base station 2A in the radio communication system 10.

In Step S101, the radio base station 2A transmits a reference signal. The radio terminal 1A receives the reference signal from the radio base station 2A at the time of powering on and handover. Likewise, in Step S102, the radio base stations 2B and 2C transmit reference signals, respectively. The radio terminal 1A receives the reference signals from the radio base stations 2B and 2C at the time of powering on and handover.

In Step S103, the radio terminal 1A measures communication qualities (for example, CQIs) of the received reference signals. In Step S104, the radio terminal 1A determines, as a connection-destination radio base station, one of the radio base stations which has transmitted a reference signal having the highest communication quality. Here, the radio base station 2A is the connection-destination radio base station of the radio terminal 1A.

In Step S105, the radio terminal 1A transmits a location registration request to the radio base station 2A which is the connection-destination radio base station. The radio base station 2A receives the location registration request from the radio terminal 1A. In Step S106, the radio base station 2A performs location registration for the radio terminal 1A.

In Step S107, the radio base station 2A allocates communication channels (an uplink communication channel and a downlink communication channel) to the radio terminal 1A. In Step S108, the radio base station 2A further transmits, to the radio terminal 1A, communication channel allocation information including identification information, and the like, on the allocated communication channels. The radio terminal 1A receives the communication channel allocation information from the radio base station 2A.

In Step S109, the radio base station 2A transmits information on an initial value of transmission power (initial transmission-power information) to the radio terminal 1A. The radio terminal 1A receives the initial transmission-power information from the radio base station 2A.

In Step S110, the radio terminal 1A sets initial transmission power in the uplink communication channel based on the received, initial transmission-power information. In Step S111, the radio terminal 1A further transmits, to the radio base station 2A, a radio signal in the initial transmission power through the allocated uplink communication channel. The radio base station 2A receives the radio signal from the radio terminal 1A.

In addition, as shown in Step S112, the radio signal transmitted by the radio terminal 1A might be an interference signal of the communication channels of the radio base stations 2B and 2C.

Figure 8:
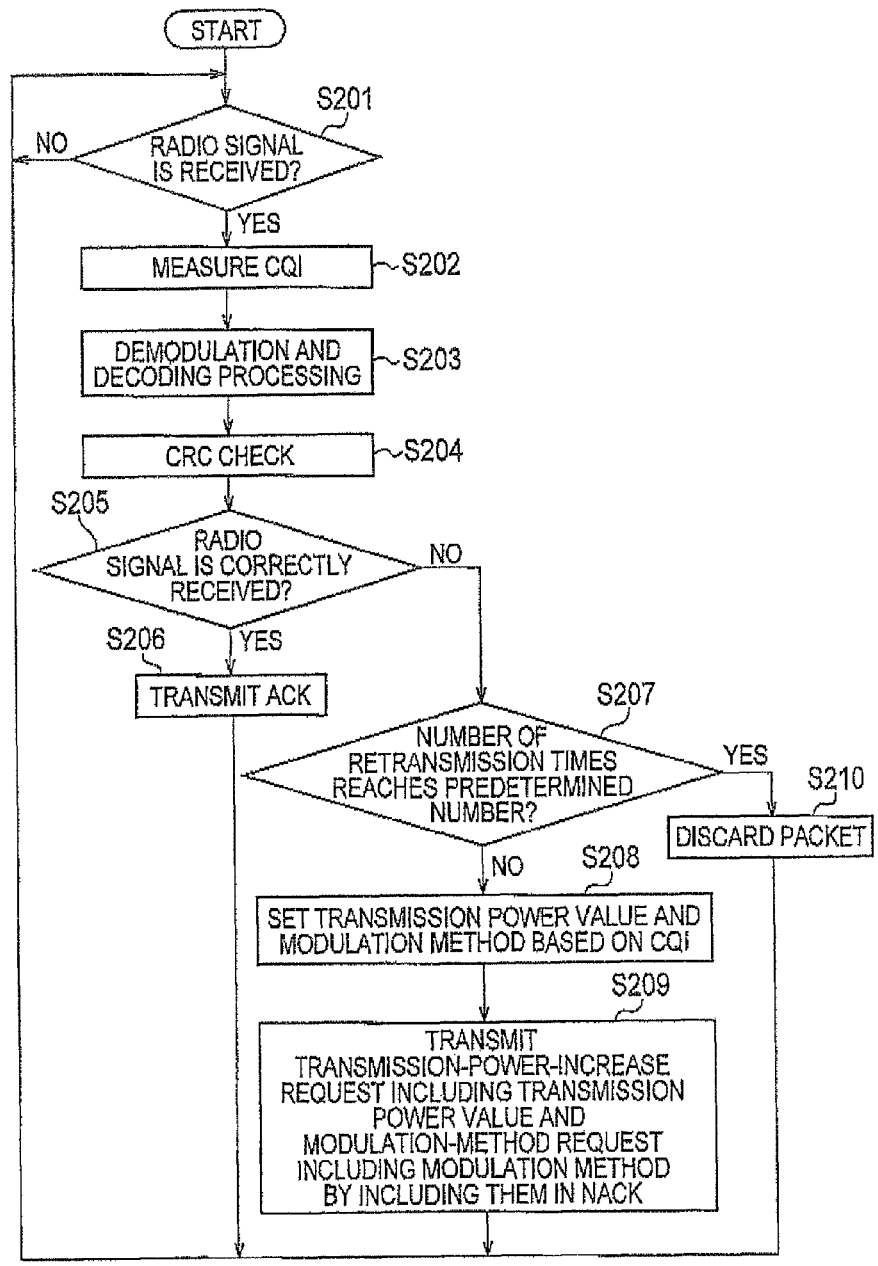
FIG. 8 is a flowchart showing an operation of a connection-destination radio base station according to the embodiment of the present invention.

Next, a description is given of an operation at the time of communication through the uplink communication channel between a radio terminal and a radio base station. FIG. 8 is a flowchart showing an operation of the radio base station 2A which serves as the connection-destination radio base station of the radio terminal 1A.

In Step S201, the controller 152 of the radio base station 2A judges whether or not the radio signal from the radio terminal 1A is received. If the radio signal is received, the CQI measurement unit 252 in the controller 152 measures a CQI of the uplink communication channel in Step S202.

In Step S203, the demapping unit 254 in the controller 152 demodulates the radio signal. Further, the decoder 256 decodes data acquired by the demodulation.

In Step S204, the CRC check unit 258 performs error detection (CRC check) based on CRC data included in the data acquired by the demodulation.

In Step S205, the transmission-power/modulation-method setting unit 260 in the controller 152 judges whether or not the radio signal is correctly received, based on a result of the error detection by the CRC check unit 258. Specifically, if an error correction based on the CRC data is impossible, the transmission-power/modulation-method setting unit 260 judges that the radio signal is not correctly received.

If the radio signal is correctly received, in Step S206 the message transmitter 262 in the controller 152 transmits, to the radio terminal 1A, ACK which is a reply indicating that the radio signal from the radio terminal 1A is correctly received.

On the other hand, if the radio signal is not correctly received, in Step S207 the transmission-power/modulation-method setting unit 260 in the controller 152 judges whether or not the number of retransmission times of the radio signal which is not correctly received reaches a predetermined number of times. If the number of retransmission times reaches the predetermined number of times, in Step S210 the transmission-power/modulation-method setting unit 260 in the controller 152 discards data corresponding to the radio signal whose number of retransmission times reaches the predetermined number of times.

On the other hand, the number of retransmission times does not reach the predetermined number of times, in Step S208 the transmission-power/modulation-method setting unit 260 in the controller 152 sets transmission power and a modulation method which are to be used for communication through the uplink communication channel, based on the CQI measured by the CQI measurement unit 252.

In Step S209, the message transmitter 262 in the controller 152 generates a transmission-power-increase request including a value of the transmission power set by the transmission-power/modulation-method setting unit 260 and generates a modulation-method request including information on the modulation method set by the transmission-power/modulation-method setting unit 260. Furthermore, the message transmitter 262 in the controller 152 transmits the transmission-power-increase request and the modulation-method request to the radio terminal 1A by including the transmission-power-increase request and the modulation-method request in NACK which is a retransmission request of the radio signal.

Figure 9:
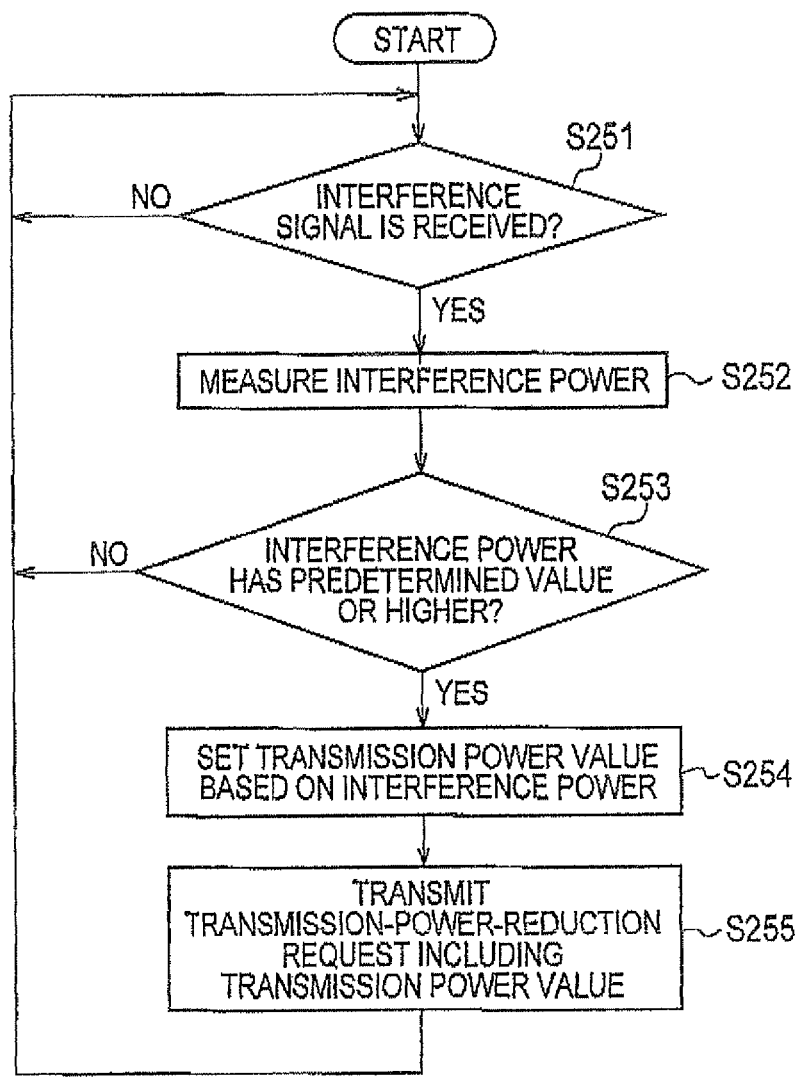
FIG. 9 is a flowchart showing an operation of a non connection-destination radio base station according to the embodiment of the present invention.

FIG. 9 is a flowchart showing an operation of the radio base station 2B which serves as the non connection-destination radio base station of the radio terminal 1A. Note that the radio base station 2C which serves as the non connection-destination radio base station of the radio terminal 1A performs the same operation as that of the radio base station 2B.

In Step S251, the controller 152 of the radio base station 2B judges whether or not an interference signal from the radio terminal 1A is received. If the interference signal is received, the interference-power measurement unit 272 in the controller 152 measures interference power in Step S252.

In Step S253, the transmission-power setting unit 274 in the controller 152 judges whether or not a value of the interference power is equal to or higher than a predetermined value. If the interference power value is equal to or higher than the predetermined value, in Step S254 the transmission-power setting unit 274 in the controller 152 sets transmission power to be used for communication through the uplink communication channel between the radio terminal 1A and the radio base station 2A, based on the interference power value.

In Step S255, the message transmitter 276 in the controller 152 transmits a transmission-power-reduction request including a value of the transmission power set by the transmission-power setting unit 274, to the radio terminal 1A.

Figure 10:
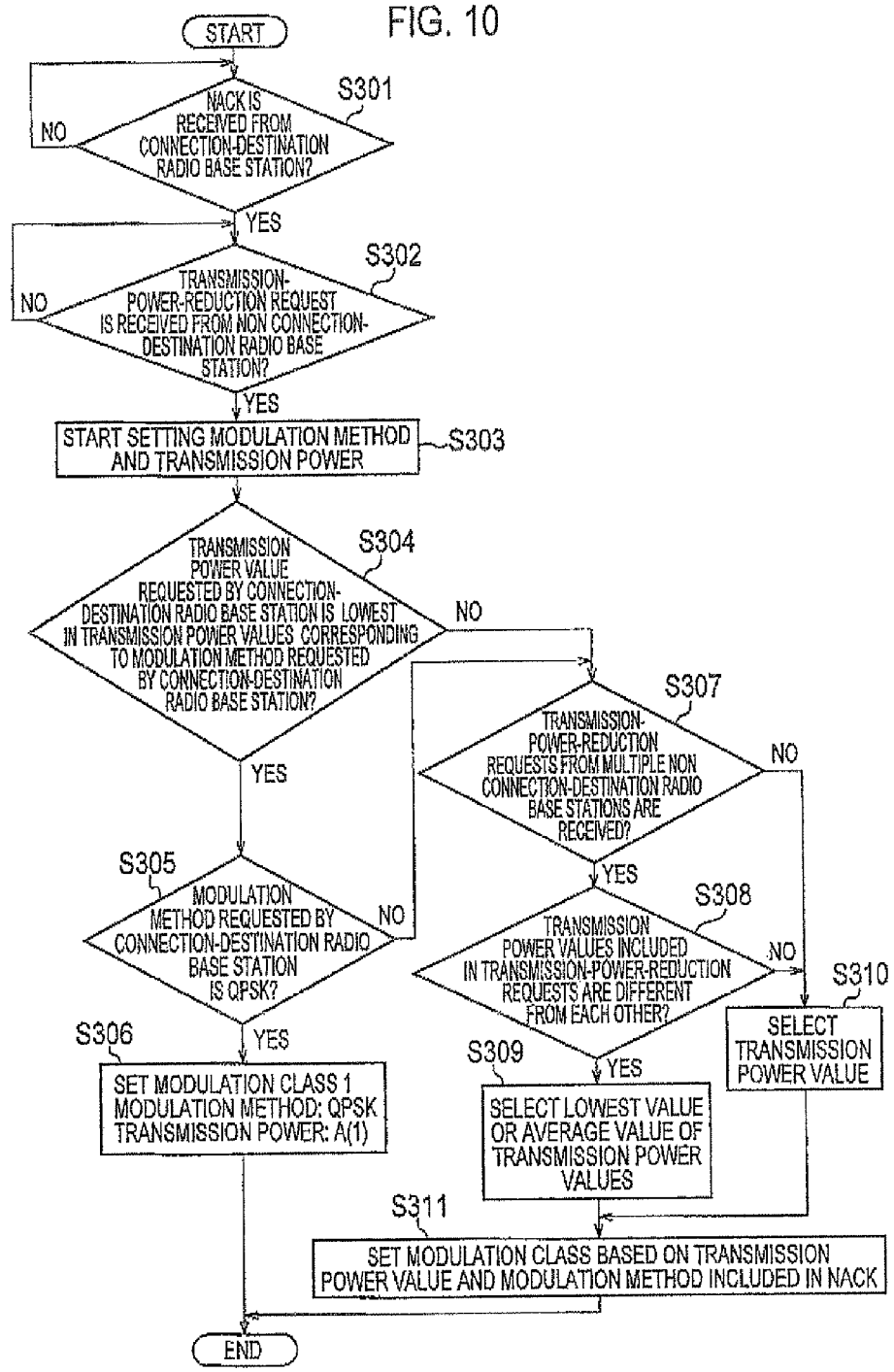
FIG. 10 is a flowchart showing an operation of the radio terminal according to the embodiment of the present invention.

FIG. 10 is a flowchart showing an operation of the radio terminal 1A.

In Step S301, the power-increase-request/modulation-method-request receiver 204 in the controller 102 judges whether or not NACK from the radio base station 2A which is the connection-destination radio base station is received. If NACK is received, in Step S302 the power-reduction-request receiver 202 in the controller 102 further judges whether or not a transmission-power-reduction request from at least one of the radio base station 2B and the radio base station 2C which are the non connection-destination radio base stations is received.

If the transmission-power-reduction request is received, in Step S303 the modulation-class setting unit 208 in the controller 102 starts setting transmission power and a modulation method for the uplink communication channel thereof.

In Step S304, based on a modulation class table stored in the storage unit 103, the modulation-class setting unit 208 in the controller 102 judges whether or not the transmission power value requested by the radio base station 2A which is the connection-destination radio base station, that is, the transmission power value included in the transmission-power-increase request in the received NACK is the lowest value in transmission power values corresponding to the modulation method requested by the radio base station 2A.

FIG. 11 is a chart showing a modulation class table stored in the storage unit 103. In the modulation class table shown in FIG. 11, modulations which are assigned numbers from 1 in order are each configured by combining a value of transmission power of the uplink communication channel and a modulation method which has a CQI equal to or higher than a required level in the case of the transmission power value.

In the modulation class table shown in FIG. 11, the lower the transmission power value, the smaller the number of the corresponding modulation class. In addition, the higher the transmission power value, the larger the number of the corresponding modulation class. This means that transmission power A(1) corresponding to No. 1 of the modulation class is the lowest, and transmission power A(N+M+L) corresponding to No. N+M+L of the modulation class is the highest.

Moreover, in the modulation class table shown, in FIG. 11, there are three types of modulation methods of QPSK, 16 QAM, and 64 QAM in ascending order of numbers of respective modulation, classes. When communications are performed by using these methods of QPSK, 16 QAM, and 64 QAM for the uplink communication channel and in the same transmission power, the order of CQIs from the best condition is QPSK, 16 QAM, and 64 QAM. That is, in an example of FIG. 11, the smaller the number of the Corresponding modulation class, the better the CQI.

In use of the modulation class table shown in FIG. 11, if a value of transmission power requested by the radio base station 2A which is the connection-destination radio base station is any one of A(1), A(N+1), and A(N+M+1) in Step S304, the modulation-class setting unit 208 in the controller 102 judges that the transmission power value is the lowest value in the transmission power values corresponding to the modulation method requested by the radio base station 2A.

The description is given by referring back to FIG. 10 again. If the transmission power value requested by the radio base station 2A which is the connection-destination radio base station is the lowest value in the transmission power values corresponding to the modulation method requested by the radio base station 2A, the modulation-class setting unit 208 in the controller 102 judges in Step S305 whether or not the modulation method requested by the radio base station 2A which is the connection-destination radio base station, that is, the modulation method included in the modulation-method request in the received NACK is QPSK.

If the modulation method requested by the radio base station 2A which is the connection-destination radio base station is QPSK, in Step S306 the modulation-class setting unit 208 in the controller 102 sets the modulation class whose number is 1 (modulation class 1), that is, the modulation class corresponding to a value of transmission power of A(1) and the modulation method of QPSK.

On the other hand, if the transmission power value requested by the radio base station 2A which is the connection-destination radio base station is judged to be not the lowest value in the transmission power values corresponding to the modulation method requested by the radio base station 2A in Step S304, or if the modulation method requested by the radio base station 2A which is the connection-destination radio base station is judged to be not QPSK in Step S305, the modulation-class setting unit 208 in the controller 102 judges in Step S307 whether or not the transmission-power-reduction requests from the multiple non connection-destination radio base stations there, the radio base station 2B and the radio base station 2C) are received.

If the transmission-power-reduction requests from the multiple non connection-destination radio base stations are received, the modulation-class setting unit 206 in the controller 102 judges in Step S308 whether or not the transmission power values included in the transmission-power-reduction requests are different from each other.

If the transmission power values included in the transmission-power-reduction requests are judged to be different from each other, in Step S309 the modulation-class setting unit 208 in the controller 102 selects the lowest value or the average value in the transmission power values.

On the other hand, if it is judged that the transmission-power-reduction requests from the multiple non connection-destination radio base stations are not received in Step S307, that is, if it is judged that a transmission-power-reduction request from a single non connection-destination radio base station is received, the modulation-class setting unit 208 in the controller 102 selects the transmission power value included an the transmission-power-reduction request from the single non connection-destination radio base station in Step S310. In addition, if the transmission power values included in the transmission-power-reduction requests are judged to be the same in Step S308, the modulation-class setting unit 208 in the controller 102 selects the same transmission power value in Step S310.

After the transmission power value is selected in any one of Step S309 and Step S310, the modulation-class setting unit 208 in the controller 102 sets a modulation class of the uplink communication channel based on the transmission power value which is selected (selected transmission power value)

and the modulation method requested by the radio base station 2A which is the connection-destination radio base station, in Step S311.

Specifically, the modulation-class setting unit 208 in the controller 102 extracts a modulation class having the selected transmission power value by referring to the modulation class table and sets the modulation class as a modulation class of the uplink communication channel. At this time, if there exists no modulation class having the selected transmission power value, the modulation-class setting unit 208 in the controller 102 sets a modulation class by combining a transmission power value which is lower than the selected transmission power value and is the closest to the selected transmission power value in the modulation classes with the corresponding modulation method.

Further, the modulation-class setting unit 208 in the controller 102 judges whether or not the modulation method included in the set modulation class coincides with the modulation method requested by the radio base station 2A which is the connection-destination radio base station.

If the modulation method included in the set modulation class coincides with the modulation method requested by the radio base station 2A which is the connection-destination radio base station, the modulation-class setting unit 208 in the controller 102 does not change the set modulation class.

On the other hand, if the modulation method included in the set modulation class does not coincide with the modulation method requested by the radio base station 2A which is the connection-destination radio base station, the modulation-class setting unit 208 in the controller 102 can employ the following two approaches.

In the first approach, the modulation-class setting unit 208 in the controller 102 does not change the set modulation class. In contrast in the second approach, if the CQI of the modulation method requested by the radio base station 2A which is the connection-destination radio base station is better than the CQI of the modulation method included in the set modulation class, the modulation-class setting unit 208 in the controller 102 changes the set modulation class to a modulation class having the highest transmission power value in the modulation classes having the modulation method requested by the radio base station 2A which is the connection-destination radio base station. On the other hand, if the CQI of the modulation method requested by the radio base station 2A which is the connection-destination radio base station is deteriorated relative to the CQI of the modulation method included in the set modulation class, the modulation-class setting unit 208 in the controller 102 does not change the set modulation class.

(3) Advantageous Effects

With the radio communication system 10 according to the embodiment of the present invention as described above, when interference power equal to or higher than a predetermined value is generated in the communication channel of the radio base station 2B or the radio base station 2C which is the non connection-destination radio base station due to communication performed through the uplink communication channel between the radio terminal 1A and the radio base station 2A which is the connection-destination radio base station, the radio terminal 1A receives a transmission-power-reduction request for the uplink communication channel from the radio base station 2B or the radio base station 2C. In addition, when the radio base station 2A which is the connection-destination radio base station fails to correctly receive a radio signal from the radio terminal 1A, the radio terminal 1A receives a transmission-power-increase request for the uplink communication channel from the radio base station 2A.

As described above, when the radio base station 2B or the radio base station 2C which is the non connection-destination radio base station and the radio base station 2A which is the connection-destination radio base station make inconsistent requests to the radio terminal 1A for the transmission power of the uplink communication channel thereof, the radio terminal 1A reduces the transmission power of the uplink communication channel according to the transmission-power-reduction request from the radio base station 2B or the radio base station 2C which is the non connection-destination radio base station. Thus, the interference power generated in the communication channel of the radio base station 2B or the radio base station 2C which is the non connection-destination, radio base station is restrained.

However, the reduction of the transmission power of the uplink communication channel goes against the transmission-power-increase request from the radio base station 2A which is the connection-destination radio base station, deteriorates the CQI of the uplink communication channel, and thus makes further difficult for the radio base station 2A to correctly receive a radio signal. For this reason, the radio terminal 1A refers to the modulation class table and thereby sets a modulation class having the reduced transmission power and a modulation method which corresponds to the reduced transmission power, that is, a modulation method which has a CQI equal to or higher than a predetermined level even if the transmission power of the uplink communication channel is reduced. Accordingly, the interference power generated in the communication channel of the radio base station 2B or the radio base station 2C is restrained, while the deterioration of the CQI of the uplink communication channel of the radio base station 2A which is the connection-destination radio base station is restrained.

In addition, with the radio communication system 10 according to the embodiment of the present invention, when the radio base station 2A which is the connection-destination radio base station transmits a modulation-method request to the radio terminal 1A, and when the CQI of a modulation method included in the modulation-method request is deteriorated relative to the CQI of the modulation method included in the set modulation class, the radio terminal 1A does not change the set modulation class. Thus, deterioration of the communication quality of the uplink communication channel can be appropriately restrained.

As described above, the present invention has been described by using the embodiment. However, it should not be understood that the description and drawings which constitute part of this disclosure limit the present invention. From this disclosure, various alternative embodiments, examples, and operation techniques will be easily found by those skilled in the art.

In the aforementioned embodiment, upon receipt of MACK from the radio base station 2A which is the connection-destination radio base station, the modulation-class setting unit 208 in the controller 102 of the radio terminal 1A immediately sets a modulation class. In contrast, the modulation-class setting unit 208 in the controller 102 of the radio terminal 1A, may be configured to increase transmission power of the uplink communication channel only when transmitting a radio signal to be retransmitted corresponding to NACK, and to reduce thereafter the transmission power of the uplink communication channel according to a transmission-power-reduction request from the radio base station 2B or the radio base station 2C which is the non connection-destination radio base station.

Meanwhile, the description has been given of the radio communication system employing LTE in the aforementioned embodiment. However, the present invention is applicable to any radio communication system as long as communication using an uplink communication channel between a radio terminal and a radio base station is performed therein.

As described above, it should be understood that the present invention includes various embodiments which are not described herein. Accordingly, the technical scope of the present invention should be determined only by the matters to define the invention in the scope of claims regarded as appropriate based on the disclosure.

Note that the entire content of Japanese Patent Application No. 2008-276942 (filed on Oct. 28, 2008) is incorporated herein by reference.

As described above, the radio communication system, the radio terminal, and the communication control method according to the present invention are capable of appropriately performing both the restraint of a communication quality and the restraint of interference and are useful as a radio communication system and the like.

The invention claimed is:

1. A radio communication system, comprising:
 a radio terminal;
 a connection-destination radio base station which is a radio base station as a connection destination for the radio terminal;
 a non-connection-destination radio base station which is a radio base station other than the connection-destination radio base station; and
 a modulation-class setting unit configured to handle inconsistent requests such that, when both a power-increase-request receiver of the radio terminal receives a power-increase request from the connection-destination radio base station and a power-reduction-request receiver of the radio terminal receives a power-reduction request from the non-connection-destination radio base station, the modulation-class setting unit sets a modulation class to a modulation class which has transmission power lower than a most recent transmission power and has a communication quality of an uplink communication channel of the connection-destination radio base station not lower than a required level;
 wherein, when (i) a first modulation method included in the set modulation class does not coincide with a second modulation method requested by the connection-destination radio base station, and (ii) a communication quality of the second modulation method is better than a communication quality of the first modulation method, the modulation-class setting unit changes the set modulation class to a modulation class having a highest transmission power value in modulation classes having the second modulation method.

2. The radio communication system according to claim 1, wherein the power-increase request and the power-reduction request are received substantially simultaneously.

3. The radio communication system according to claim 1, wherein the connection-destination radio base station transmits a power-increase request to the radio terminal whenever the communication quality of the uplink communication channel allocated to the radio terminal falls below a predetermined level.

4. The radio communication system according to claim 1, wherein the uplink communication channel between the connection-destination radio base station and the radio terminal is on a same frequency band as a second communication channel between the non-connection-destination radio base station and a second radio terminal.

5. The radio communication system according to claim 1, wherein the connection-destination radio base station transmits a power-increase request to the radio terminal when a distance between the radio terminal and the connection-destination radio base station increases.

6. The radio communication system according to claim 1, wherein the non-connection-destination radio base station transmits the power reduction request to the radio terminal whenever an interference power equal to or higher than a predetermined value is generated in a communication channel of the non-connection-destination radio base station.

7. A radio terminal, comprising:
 a power-increase-request receiver configured to receive a power-increase request transmitted from a connection-destination radio base station, the power-increase request requesting an increase of a transmission power of an uplink communication channel;
 a power-reduction-request receiver configured to receive a power-reduction request transmitted from a non-connection-destination radio base station which is a base station other than the connection-destination radio base station, the power-reduction request requesting a reduction of the transmission power of the uplink communication channel; and
 a modulation-class setting unit configured to handle inconsistent requests such that, when the power-increase-request receiver receives the power-increase request and the power-reduction-request receiver receives the power-reduction request, the modulation-class setting unit sets a modulation class to be a modulation class which has a transmission power lower than a most recent transmission power and has a communication quality of the uplink communication channel not lower than a required level;
 wherein, when (i) a first modulation method included in the set modulation class does not coincide with a second modulation method requested by the connection-destination radio base station, and (ii) a communication quality of the second modulation method is better than a communication quality of the first modulation method, the modulation-class setting unit changes the set modulation class to a modulation class having a highest transmission power value in modulation classes having the second modulation method.

8. The radio terminal according to claim 7, wherein
 the power-reduction request includes a transmission power value, and
 the modulation-class setting unit sets a transmission power value of the modulation class to correspond to the transmission power value included in the power-reduction request.

9. The radio terminal according to claim 8, wherein
 the power-reduction-request receiver receives a plurality of power-reduction requests transmitted from a plurality of non-connection-destination radio base stations, and
 the modulation-class setting unit sets the transmission power of the modulation class to a value corresponding to one of: a lowest value in a plurality of transmission power values and an average value of the plurality of transmission power values, the plurality of transmission power values being included in the plurality of the power-reduction requests.

10. The radio terminal according to claim 8, further comprising a modulation-method-request receiver configured to receive a modulation-method request transmitted from the connection-destination radio base station, the modulation-method request requesting setting of a modulation method of the uplink communication channel, wherein the modulation-class setting unit sets the modulation method to correspond to the modulation-method request received by the modulation-method request receiver.

11. The radio terminal according to claim 10, wherein when the communication quality of the uplink communication channel falls below the required level, the modulation-class setting unit sets the modulation method of the uplink communication channel to correspond to a modulation method other than the modulation method corresponding to the modulation-method request.

12. The radio terminal according to claim 7, further comprising a modulation-method-request receiver configured to receive a modulation-method request transmitted from the connection-destination radio base station, the modulation-method request requesting setting of a modulation method of the uplink communication channel, wherein the modulation-class setting unit sets the modulation method to correspond to the modulation-method request received by the modulation-method request receiver.

13. The radio terminal according to claim 12, wherein when the communication quality of the uplink communication channel falls below the required level, the modulation-class setting unit sets the modulation method of the uplink communication channel to correspond to a modulation method other than the modulation method corresponding to the modulation-method request.

14. The radio terminal according to claim 7, further comprising a retransmission-request receiver configured to receive a retransmission request transmitted by the connection-destination radio base station, wherein when the retransmission-request receiver receives the retransmission request, the modulation-class setting unit sets the transmission power higher than the most recent transmission power only at the time of transmitting a radio signal targeted by the retransmission request.

15. The radio terminal according to claim 7, further comprising a modulation-method-request receiver configured to receive a modulation-method request transmitted from the connection-destination radio base station, the modulation-method request requesting setting of a modulation method of the uplink communication channel, wherein the modulation-class setting unit sets the modulation method of the uplink communication channel to correspond to the modulation-method request received by the modulation-method request receiver.

16. The radio terminal according to claim 15, wherein when the communication quality of the uplink communication channel falls below the required level, the modulation-class setting unit sets the modulation method of the uplink communication channel to correspond to a modulation method other than the modulation method corresponding to the modulation-method request.

17. A communication control method, comprising the steps of:
receiving, by a radio terminal, a power-increase request transmitted from a connection-destination radio base station, the power-increase request being for requesting an increase of a transmission power of an uplink communication channel of the connection-destination radio base station;
receiving, by the radio terminal, a power-reduction request transmitted from a non-connection-destination radio base station, the power-reduction request being for requesting reduction of the transmission power of the uplink communication channel; and
upon receipt of the power-increase request and the power-reduction request, setting, by a modulation class setting unit of the radio terminal, a modulation class to a modulation class which has a transmission power lower than a most recent transmission power and has a communication quality of the uplink communication channel not lower than a required level;
wherein, when (i) a first modulation method included in the set modulation class does not coincide with a second modulation method requested by the connection-destination radio base station, and (ii) a communication quality of the second modulation method is better than a communication quality of the first modulation method, the modulation-class setting unit changes the set modulation class to a modulation class having a highest transmission power value in modulation classes having the second modulation method.

* * * * *